United States Patent
Free et al.

[15] 3,679,963
[45] July 25, 1972

[54] NEUTRON RADIATION AND GAMMA RAY HARDENED ADJUSTABLE POWER SUPPLY

[72] Inventors: Maurice G. Free, Tempe; Leo L. Wisseman, Scottsdale, both of Ariz.

[73] Assignees: MOOTORA, Inc., Franklin Park, Ill.; Motorola, Inc., Franklin Park, Ill.

[22] Filed: Jan. 30, 1970

[21] Appl. No.: 7,164

[52] U.S. Cl. ................................323/4, 307/33, 307/297
[51] Int. Cl. ................................................G05f 1/58
[58] Field of Search ..................307/297, 31, 33; 323/1, 4

[56] References Cited

UNITED STATES PATENTS

| | | | |
|---|---|---|---|
| 3,512,047 | 5/1970 | Garde | 323/4 X |
| 3,508,081 | 4/1970 | Matsuda | 323/4 UX |
| 3,534,245 | 10/1970 | Limberg | 323/4 |

OTHER PUBLICATIONS

M. P. Xylander, " Single Voltage Supply, High- Performance Logic Circuit," IBM Technical Disclosure Bulletin, Vol. 11, No. 9, February, 1969, page 1099.

*Primary Examiner*—A. D. Pellinen
*Attorney*—Mueller, Aichele & Gillman

[57] ABSTRACT

A current supply including matched transistors and diodes in which circulating paths are provided for the increased base currents due to decrease of beta of the transistors caused by neutron radiation and for the photoelectric currents produced in the transistors and diodes due to gamma ray radiation. The flow of current provided by the radiation and gamma hardened current source is adjustable.

6 Claims, 1 Drawing Figure

PATENTED JUL 25 1972
3,679,963
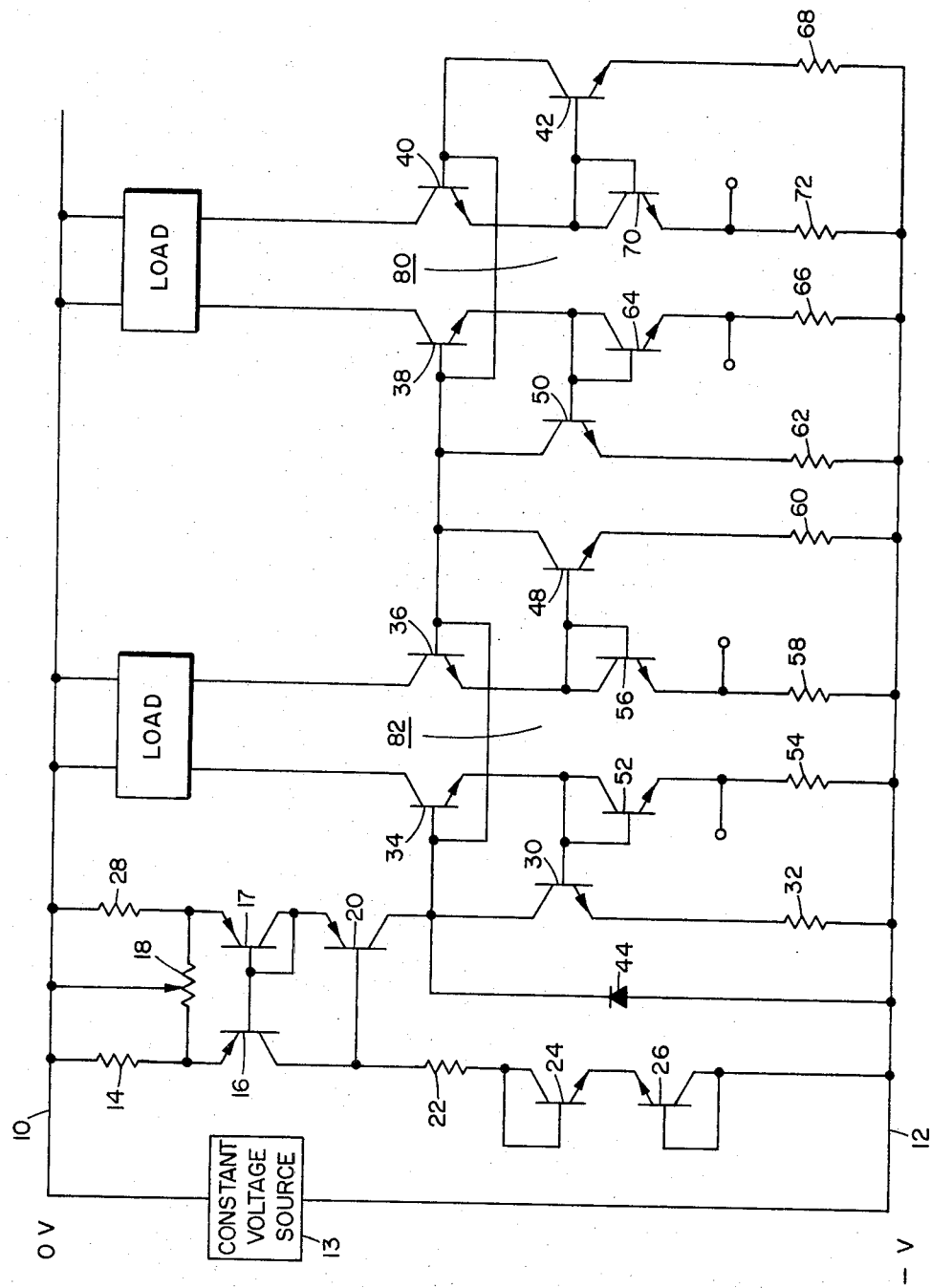
INVENTOR.
Maurice G. Free
Leo L. Wisseman
BY
Mueller, Aichele & Rauner
ATTY'S.

NEUTRON RADIATION AND GAMMA RAY HARDENED ADJUSTABLE POWER SUPPLY

BACKGROUND

This invention relates to current supplies.

When a known current supply including transistors and diodes is exposed to neutron or gamma ray radiation, the current supplied thereby is varied. This is due to the fact that the beta of a transistor is decreased upon neutron radiation thereof whereby a greater percentage of the emitter current flows in the base upon neutron radiation of the transistor than before neutron radiation thereof. Furthermore, gamma ray radiation of a transistor or diode causes current to flow therein due to a photoelectric effect. Therefore, if a current supply is exposed to neutron or gamma ray radiation, the current provided thereby changes. The change in current is an undesirable effect. Furthermore, the current supplied by the radiation hardened supply should be adjustable as desired.

It is an object of this invention to provide an improved current supply.

It is a further object of this invention to provide a neutron and gamma ray hardened current supply whose output current is adjustable at will.

SUMMARY

According to this invention, a pair of transistors are so connected that the increase of base current of each transistor due to neutron radiation thereof flows into a main electrode of the other transistor and out another main electrode thereof, wherein means are provided to keep the main electrode flow of both transistors constant in spite of neutron irradiation thereof, and in which circuit means are provided to cause current flow due to gamma radiation of a third transistor to bypass said pair of transistors, while a balancing circuit is provided for the gamma ray current of one of said pair of transistors. Furthermore, according to this invention, means may be provided to vary the current flow in said third transistor and in one of said pair of transistors with respect to said balancing circuit.

DESCRIPTION

This invention will be better understood upon reading the following description in connection with the accompanying drawing in which the sole FIGURE illustrates an embodiment of this invention.

Turning to the FIGURE, a ground line or bus 10 and a negative bus 12 are provided. A constant voltage source 13 may be connected between the busses 10 and 12. A resistor 14 is connected between the ground bus 10 and the emitter of a PNP transistor 16 and to one end of a potentiometer resistor 18. The collector of transistor 16 is connected to the base of a PNP transistor 20 and through a resistor 22 to the collector and base of a diode connected NPN transistor 24. The base of the transistor 16 is connected to the base and collector of a diode connected PNP transistor 17. The cathode of the diode 24 is connected to the cathode of a diode-connected NPN transistor 26, and the anode comprising the collector and base of the diode 26 is connected to the negative bus 12. Therefore, the diode 24 is forward biased and the diode 26 is reverse biased and a voltage regulated zero temperature coefficient voltage appears between the negative bus 12 and the base of the transistor 20.

A resistor 28 is connected between the ground bus 10 and the anode of the diode 17. The anode of the diode 17 is also connected to the other end of the potentiometer resistor 18, and a tap on the resistor 18 is connected to the ground bus 10. The cathode of the diode 17 is connected to the emitter of the PNP transistor 20. The collector of the transistor 20 is connected to the collector of an NPN transistor 30 whose emitter is connected through a resistor 32 to the negative bus 12. The collector of the transistor 20 is also connected to the bases of the NPN transistor 34, 36, 38, and 40 and to the collectors of NPN transistors 42, 48, and 50, as well as to the cathode of a diode 44. The base of the transistor 30 is connected to the base and collector comprising the anode of a diode connected NPN transistor 52. The cathode of the diode 52 is connected to the negative bus 12 by way of a resistor 54. The base of the transistor 30 is also connected to the emitter of the transistor 34. The emitter of the transistor 36 is connected to the base of the transistor 48 and also to the anode comprising the connected base and collector of a diode connected NPN transistor 56. The cathode of the diode 56 is connected to the negative bus by way of a resistor 58. The emitter of the transistor 48 is connected by way of a resistor 60 to a negative bus 12.

The emitter of the transistor 50 is connected to the negative bus by way of the resistor 62. The base of the transistor 50 is connected to the emitter of the transistor 38 and to the anode, comprising the connected base and collector, of a diode connected NPN transistor 64. The cathode of the diode 64 is connected to the negative bus 12 by way of a resistor 66.

The emitter of the transistor 40 is connected to the base of the transistor 42. The emitter of the transistor 42 is connected to the negative bus 12 by way of a resistor 68. The emitter of the transistor 40 is also connected to the anode comprising the connected collector and base of an NPN transistor 70. The cathode of the diode 70 is connected to the negative bus 12 by way of a resistor 72.

A load which may be a differential amplifier may be connected between the collectors of the transistors 34 and 36 and the ground bus 10. Another load, which may be another differential amplifier, may be connected between the collector of the transistors 38 and 40 and the ground bus 10. The current flowing to the loads will not change with irradiation by neutrons or gamma rays as will be explained. The division of current between the parts of the differential amplifiers connected to the collectors of the transistors 34 and 36 may be changed by connecting different resistors (not shown) across the resistors 54 and 58. Similarly, the way the current divides between the two halves of the differential amplifier connected to the collectors of the transistors 38 and 40 may be varied by varying the resistance (not shown) connected across resistors 66 and 72. The way the current divides between the load connected to the transistors 34 and 36 on the one hand, and the load connected to the transistors 38 and 40, on the other hand, may be controlled by varying the sum of the resistors 54 and 58 and any resistor connected in shunt therewith as compared to the sum of the resistors 66 and 72 and any resistors connected in shunt therewith.

For operation of the disclosed device as a radiation hardened current source, the transistors 16, 17, and 20 are as closely matched to each other as is practically possible. Also, the resistors 14 and 28 are closely matched as are the transistors 16 and 20. Furthermore, the transistors 30 and 34 are closely matched. Since high beta transistors are chosen, the base current from these transistors 16, 20, 30, and 34 is very low and for practical purposes can be ignored. The transistor 30 also matches the diode 52 and resistors 32 and 54 are matched. Furthermore, the transistors 34 and 36 are matched, the transistors 30 and 48 are matched, and the diodes 52 and 56 are matched as are similarly connected resistors 32 and 60 as well as resistors 54 and 58. Furthermore, in the circuit 80 comprising the elements 38, 40, 42, 50, 62, 64, 66, 68, 70 and 72, and in the circuit 82 comprising the elements 30, 32, 34, 36, 48, 52, 54, 56, 58 and 60, corresponding elements similarly connected are matched.

Due to the matching of the elements 30 to 52 and 32 to 54, the same amount of current that flows through the emitter-collector path of the transistor 30 also flows through the diode 52 and the resistor 54. It follows, therefore, that the collector-to-emitter current of the transistor 34 and of the transistor 30 are always the same.

Now, let it be assumed that the circuit as described is irradiated with neutrons. Neutron irradiation decreases the lifetime of minority carriers in semiconductors whereby the betas of the neutron irradiated transistors are decreased. This causes an increase in the respective base currents for the same collector current, and the base current can no longer be ignored. However, since the transistors 30 and 34 are carefully matched, the increases in base currents are equal for the two transistors 30 and 34. The current flowing out of the collector of the transistor 20 now splits and part of it flows to the base of the transistor 34 tending to decrease the current flow from collector to emitter of the transistor 30. However, the increased base current for the transistor 30 flows through the collector-to-emitter path of the transistor 34 tending to increase the current flow out of the emitter of the transistor 30. These effects balance. Therefore, the current flowing in the resistors 32 and 54 remains constant in spite of the neutron irradiation. Therefore, the current flowing out of the collector of the transistor 20 remains equal to the current flowing into the collector of the transistor 34, which due to the symmetry of the circuit is also equal to the current flowing into the collector of the transistor 36. Furthermore, increased base current, due to the beta changes in each of the transistors 36 and 48, flows through the other transistor, in the manner explained in connection with the transistors 30 and 34. Since the circuit 80 is as nearly as is practically possible identical with the circuit 82, the current supplied to the load from the collectors of the transistors 38 and 40 similarly acts as a neutron hardened current source.

Considering the PNP transistors 16 and 20 and the diode connected PNP transistor 17, the increased base current due to neutron radiation of the transistor 16 flows into the emitter of the transistor 20, tending to lessen the current flow in the resistor 22. However, the increased base current for the transistor 20 flows in the resistor 22, whereby there is no current change in the resistor 22 or into the collector of the transistor 30 due to irradiation of the transistors 16 and 20. Therefore, neutron radiation does not effect the current flow through the transistor 30. Due to the matching thereof, diode 17 ensures that the emitter current in transistor 20 equals the emitter current of transistor 16. Therefore, the current out of the collector of the transistor 20 tends to remain constant in spite of irradiation with neutrons. Since the current out of the collector of the transistor 20 does not change, the load current at the collectors of the transistors 34 and 36 cannot change.

While only two similar circuits 80 and 82 are shown, one or more further current circuits identical therewith may be connected between the collector of the transistor 20 and the negative bus 12.

Gamma ray irradiation causes current to flow in the reverse biased junction, the collector junction, of a transistor in the reverse direction. This gamma ray irradiation is self-balancing in the disclosed circuit since it affects the transistors 34 and 36 similarly, that is, the gamma irradiation currents induced in the transistors 34, 36, 38 and 40 flows, respectively, in the diodes 52, 56, 64 and 70 to the negative bus 12, whereby the gamma ray current does not disturb the balance of the several circuits 80 and 82. Since the gamma ray current is itself in the order of a microampere and the current flowing through the diodes 52, 56, 64 and 70, due to normal operation of the described circuit, is at least a milliampere, the gamma ray current is negligible by comparison with the normal current flowing in these diodes. The gamma ray current induced in the transistor 20 is bypassed to the negative bus 12 by the diode 44 and does not affect the current flow in the transistors 34, 36, 38 or 40.

Upon varying the effective value of the resistors 14 and 28, as by varying the position of the tap on the potentiometer 18, the current supplied by the circuits 80 and 82 may be adjusted. Upon varying the effective value of the resistors 54 with respect to 58 as by connecting a resistor in parallel with one or both thereof, the current provided by the collector of the transistor 34 may be varied with respect to the current supplied by the transistor 36. By varying the value of the resistors 54 and 58 with respect to the resistors 66 and 72, the current supplied by the circuit 82 may be varied with respect to the current supplied by the circuit 80.

What is claimed is:

1. A neutron hardened current source comprising:
a first and a second and a third transistor, said transistors being matched and each having a pair of main electrodes and a control electrode,
an impedance, means for connecting the main electrodes of said first transistor in series between a ground bus and a voltage bus in series with said impedance,
means for connecting said second transistor as a diode having an anode and a cathode electrodes,
means for connecting said diode and the main electrodes of said third transistor across said buses,
means for connecting the control electrode of said first transistor to an electrode of said diode, and
means for connecting the control electrode of said third transistor to the junction of a main electrode of said impedance and said first transistor, whereby current flow of said third transistor is substantially independent of neutron irradiation.

2. The invention of claim 1 in which a second and a third diode are provided, said second and third diodes being connected in series with the main electrodes of said first transistor between said buses, said diodes being oppositely poled in said series connection.

3. The invention of claim 1 in which a constant voltage source is connected between said buses.

4. The invention of claim 1 in which said voltage bus is at negative potential with respect to ground, said transistors being of the same type, the emitters of said first and second transistors being connected to one of said buses and the collector of said third transistor being connected to the other of said buses.

5. The invention of claim 1 in which fourth, fifth, and sixth transistors are provided all the having a pair of main electrodes and a control electrode, main electrodes of said fourth transistor being connected between a main electrode of said third transistor and one of said buses, the base of said fourth transistor being connected to the anode of a diode connected fifth transistor and also to a main electrode of said sixth transistor, the control electrode of said sixth transistor being connected to the connection between said third and fourth transistors, the other main electrode of said sixth transistor being connected by way of load to a bus and the cathode of said fifth transistor being connected to the other bus.

6. The invention of claim 5 in which a seventh, eighth and ninth transistor is provided each having a pair of main electrodes and a control electrode, said seventh transistor being connected as a diode, said diode and the main electrodes of said eighth transistor being connected in series with a load between said buses, the control electrodes of said sixth and eighth transistors being connected together, the main electrodes of said ninth transistor being connected between a bus and the control electrode of said eighth transistor and the control electrode of said ninth transistor being connected to the anode of said seventh transistor.

* * * * *